No. 882,998. PATENTED MAR. 24, 1908.
N. F. COFFEY.
SIX WHEELED LOGGING AUTOMOBILE.
APPLICATION FILED OCT. 1, 1907.
2 SHEETS—SHEET 1.
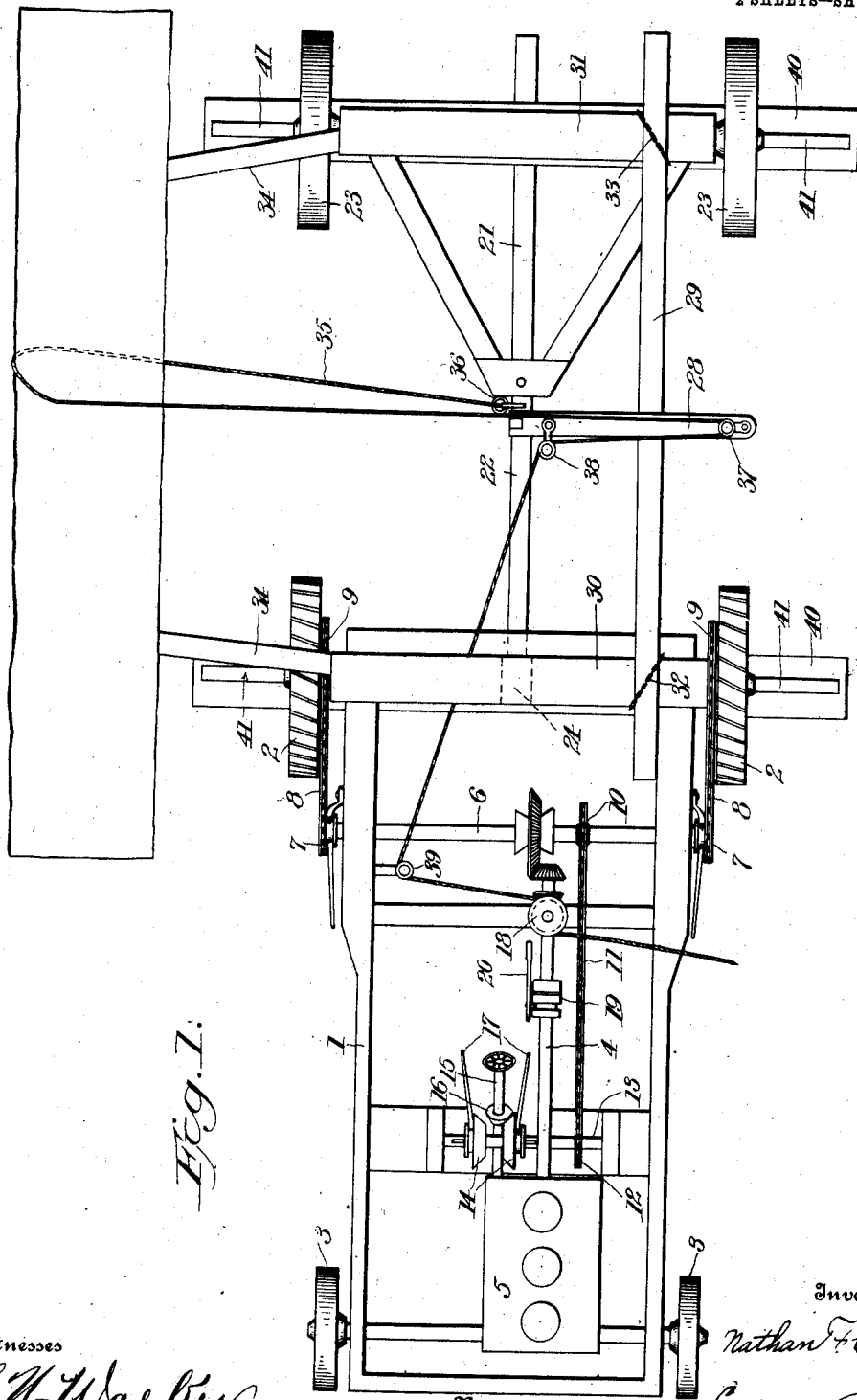
Witnesses
Inventor
Nathan F. Coffey,
By
Attorneys No. 882,998. PATENTED MAR. 24, 1908.
N. F. COFFEY.
SIX WHEELED LOGGING AUTOMOBILE.
APPLICATION FILED OCT. 1, 1907.
2 SHEETS—SHEET 2.
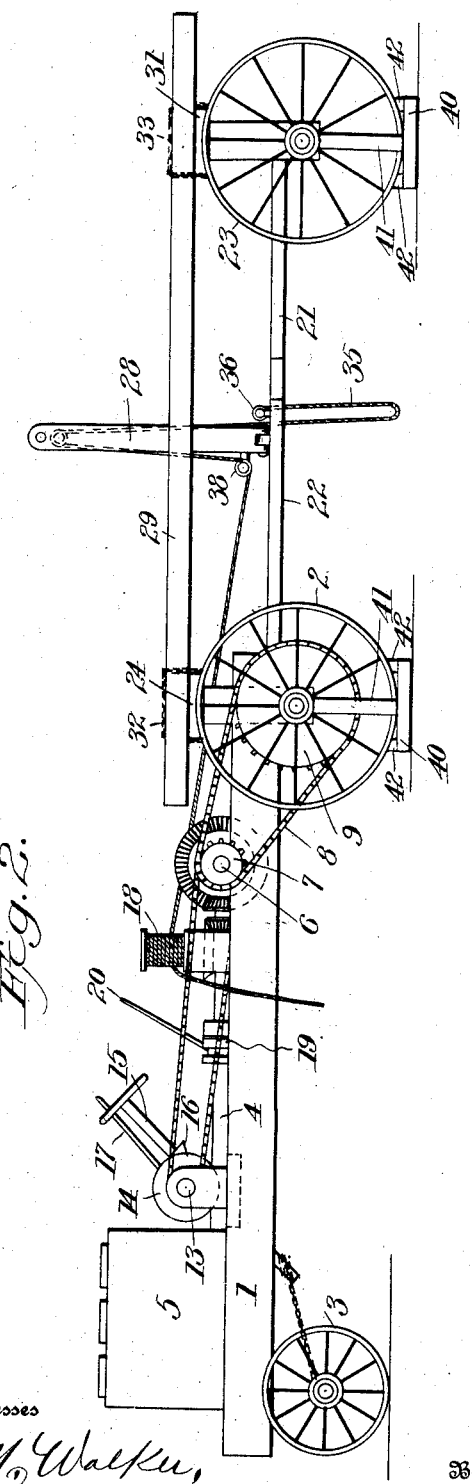
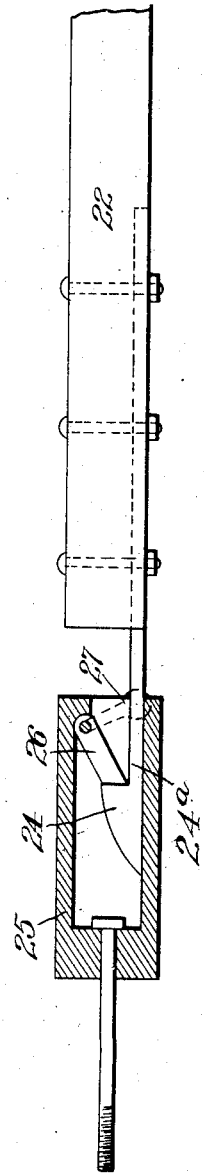
Witnesses
C. N. Walker,
F. J. Veihmeyer,
Inventor
Nathan F. Coffey,
By Edson Bros,
Attorneys

UNITED STATES PATENT OFFICE.

NATHAN F. COFFEY, OF BLACK ROCK, ARKANSAS.

SIX-WHEELED LOGGING-AUTOMOBILE.

No. 882,998.　　　　Specification of Letters Patent.　　Patented March 24, 1908.

Application filed October 1, 1907. Serial No. 395,362.

*To all whom it may concern:*

Be it known that I, NATHAN F. COFFEY, a citizen of the United States, residing at Black Rock, in the county of Lawrence and State of Arkansas, have invented certain new and useful Improvements in Six-Wheeled Logging-Automobiles; and I do hereby declare the following to be a full, clear, and exact description of the invention, such as will enable others skilled in the art to which it appertains to make and use the same.

My invention relates to a six wheeled logging automobile.

It has for its object to provide a simple, inexpensive and practical device for pulling logs from swamps, and other places inaccessible to horse or cattle teams, skidding or loading and transporting them to mill or shipping point in localities where saw timber is not in sufficient quantities to justify the expense of building tramways and using derrick cars or cable systems.

The invention comprises a four wheeled main truck and a two wheeled extension truck detachably connected to said main truck. Shaft and gear connections from the driving motor or engine render it possible to employ said motor power to assist in steering the vehicle, and to pull the logs to and haul them upon said vehicle. The extension truck is provided with a reversible derrick post carrying pulleys over which the hauling cable runs, whereby logs may be drawn or pulled from either side of the vehicle.

The invention also consists in the further features of construction and combinations of parts hereinafter described and specified in the claims.

In the accompanying drawings, illustrating the preferred embodiment of my invention: Figure 1 is a plan view of the automobile, certain common and necessary parts such as the oil tank, brake, etc. being omitted to permit the novel feature of the structure to be clearly illustrated. Fig. 2 is a side elevation, and Fig. 3 is an enlarged sectional view of the coupling between the main truck and the extension truck.

Referring more particularly to the drawings, 1 designates the frame of the main truck at the rear end of which are mounted the traction wheels. Steering wheels 3 are arranged at the front end of said frame. The main power shaft 4, which is driven by the motor 5, is connected by suitable gearing with the two part counter shaft 6 carrying sprockets 7. Sprocket chains 8 passed also over sprockets 9 on the wheels 2 serve to drive said wheels. One of the sections of the shaft 6 carries a second sprocket 10 over which runs a sprocket chain 11 connected to sprocket 12 of a short shaft 13. Oppositely beveled and facing friction wheels 14 are carried by said shaft 13. The steering shaft 15 is provided with a beveled friction wheel 16. Either one of the friction wheels 14 may be brought into contact with said wheel 16 by operating the levers 17 whereby the motor power is utilized to aid in turning the steering wheels. The main shaft is also geared up with a capstan 18, the function of which will be hereinafter explained. Said main shaft is further provided with a friction clutch 19 controlled by the lever 20 whereby the rear section of said shaft may be coupled with or uncoupled from the front section.

The extension truck 21 comprises a reach bar 22 mounted on a pair of wheels 23 and having its front end hooked, as at 24. Said hooked end is adapted to be coupled with a socket piece 25 fitted with a gravity locking pawl 26. By means of lever 27 mounted on the axle of said pawl the latter may be raised to release the reach bar when it is desired to disconnect the extension truck from the main truck. It will be noted that the shape of the hooked end of the reach bar, as shown in Fig. 3 is such that if the extension truck should be turned over by any cause, said hook will be disengaged from said socket piece thereby preventing the upsetting of the main truck as well. In the event of the upsetting of the extension truck, the shank $24^a$ on the hook 24 will engage the pawl 26 and throw it up out of engagement with said hook as said shank turns in the socket piece 25 thereby disconnecting said extension truck from the main truck.

The derrick post 28 is hinged to the reach bar so that it may be turned to either side. A beam 29 secured to said post is adapted to be secured to the bolsters 30 and 31 by means of chains 32 and 33 in either position of the derrick post. Logs may be dragged to the vehicle and hauled up upon the rear or extension truck over the skids 34 by means of a cable 35 one end of which is attached to a ring 36 on the reach bar near the base of the derrick post. Said cable is passed around the log, as shown, and back through pulley 37 on the upper end of the derrick post, thence through pulley 38 at the base of said post and over pulley 39 on the main truck frame to the capstan around which it is passed several times, the other end extending out at the side of the vehicle where it is held and handled by the operator.

When heavy strain is to be placed on the cable, the traction wheels and the wheels on the extension truck may be run upon planks 40 and blocked and braced as at 41 and 42 respectively. It will be noted that the use of the extension truck permits the handling of logs and other articles which would be dangerous or impractical on a four wheeled vehicle already encumbered with an engine and other machinery. Said extension truck is preferable to a separate four wheeled truck used as a trailer because it is more wieldy and more easily handled and the additional weight of one end of each of the logs upon the traction wheels is necessary to secure adhesion to the ground and prevent slipping. The capstan and pulling arrangement may be used to pull loaded vehicles out of mud holes or over obstructions when the regular propelling power is inadequate.

While the invention is intended primarily for a logging vehicle, it is of value to handle and haul heavy freight of other descriptions, or a passenger coach of large capacity. Also, the motor and connections can be used for various other purposes such as are usually accomplished by ordinary portable engines.

I claim:

1. The combination, with a main truck, of a two-wheeled extension truck connected to said main truck, a derrick post on said extension truck, a capstan on said main truck, and a cable extending from said capstan over pulleys on said derrick post for the purpose specified.

2. The combination, with a main truck, of a two-wheeled extension truck connected to said main truck, a derrick post hinged to said extension truck and adapted to be inclined towards either side of the vehicle, means to retain said post in either position, a capstan on said main truck, and a cable extending from said capstan over pulleys on said derrick post for the purpose of drawing articles from either side of the vehicle.

3. The combination, with a main truck, of a two-wheeled extension truck having a reach bar connected to said main truck, a derrick post hinged to said reach bar and adapted to be inclined towards either side of the vehicle, a beam secured to said post, bolsters on said main and auxiliary truck, means to secure the ends of said beams to said bolsters in either position of said post, a capstan on the main truck and a cable extending from said capstan over pulleys on said post for the purpose specified.

4. The combination, with a motor driven main truck, of a two-wheeled extension truck connected to said main truck, a derrick post on said extension truck, a capstan on said main truck and geared up with the driving motor, and a cable extending from said capstan over pulleys on said derrick post for the purpose specified.

5. The combination, with a motor driven main truck, of a two-wheeled extension truck connected to said main truck, an auxiliary shaft on said main truck having driving connection with the motor shaft, two facing beveled friction wheels on said auxiliary shaft, a beveled friction wheel on the steering shaft and arranged between said wheels on said auxiliary shaft, means to move either of said latter wheels into contact with the wheel on the steering shaft for the purpose specified, a derrick post on said extension truck, a capstan on said main truck and geared up with the motor shaft, and a cable extending from said capstan over pulleys on said derrick post for the purpose specified.

In testimony whereof, I affix my signature, in presence of two witnesses.

NATHAN F. COFFEY.

Witnesses:
J. W. DAVIS,
W. A. CAMPBELL.